(12) United States Patent
Yu et al.

(10) Patent No.: US 12,500,904 B2
(45) Date of Patent: Dec. 16, 2025

(54) ARTIFICIAL INTELLIGENCE-BASED CYBER TRAINING METHOD AND APPARATUS

(71) Applicant: ELECTRONICS AND TELECOMMUNICATIONS RESEARCH INSTITUTE, Daejeon (KR)

(72) Inventors: Jae-Hak Yu, Daejeon (KR); Ki-Jong Koo, Daejeon (KR); Dae-Sung Moon, Daejeon (KR); Ik-Kyun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 50 days.

(21) Appl. No.: 18/454,573

(22) Filed: Aug. 23, 2023

(65) Prior Publication Data
US 2024/0163297 A1    May 16, 2024

(30) Foreign Application Priority Data
Nov. 15, 2022 (KR) .................. 10-2022-0152658

(51) Int. Cl.
*H04L 9/40* (2022.01)
*H04L 41/16* (2022.01)

(52) U.S. Cl.
CPC .......... *H04L 63/1416* (2013.01); *H04L 41/16* (2013.01)

(58) Field of Classification Search
CPC . H04L 63/1416; H04L 41/16; H04L 63/1433; H04L 63/1441; H04L 63/1425; G06N 3/088; G06N 20/00; H04N 21/251; H04N 21/466; H04N 21/45; H04N 21/4662; G06F 7/023
See application file for complete search history.

(56) References Cited

U.S. PATENT DOCUMENTS

| 10,382,474 B2 | 8/2019 | Hason |
| 10,868,825 B1 * | 12/2020 | Dominessy ........... H04L 43/045 |
| 2016/0182533 A1 * | 6/2016 | Purpura ................. H04L 63/145 |
| | | 726/23 |
| 2017/0304707 A1 * | 10/2017 | Morton ................... A63F 13/85 |

(Continued)

FOREIGN PATENT DOCUMENTS

| KR | 10-2212796 B1 | 2/2021 |
| KR | 10-2021-0056766 A | 5/2021 |

(Continued)

OTHER PUBLICATIONS

Mohamed C. Ghanem et al., "Reinforcement Learning for Efficient Network Penetration Testing," MDPI, Dec. 20, 2019.

*Primary Examiner* — Michael Won

(57) ABSTRACT

Disclosed herein are an artificial Intelligence (AI)-based cyber training method. The AI-based cyber training method may include generating a unit attack by training an attack agent based on environment and state information of a cyber range (CR) and a set of attack tools executable on a system, executing the unit attack in the CR, and then determining whether the unit attack has succeeded, and determining whether to perform an attack or a defense based on whether the unit attack has succeeded.

14 Claims, 8 Drawing Sheets

(56) References Cited

U.S. PATENT DOCUMENTS

| | | | |
|---|---|---|---|
| 2019/0019432 A1 | 1/2019 | Kim et al. | |
| 2019/0319985 A1 | 10/2019 | Kim et al. | |
| 2020/0389478 A1* | 12/2020 | Abbaszadeh | H04L 43/12 |
| 2022/0094702 A1* | 3/2022 | Saad Ahmed | H04L 63/1416 |
| 2022/0238037 A1* | 7/2022 | Donovan | G09B 7/04 |
| 2023/0021214 A1* | 1/2023 | Lehmer | H02S 50/10 |
| 2024/0414190 A1* | 12/2024 | Lal | H04L 63/1416 |

FOREIGN PATENT DOCUMENTS

| | | |
|---|---|---|
| KR | 10-2021-0063759 A | 6/2021 |
| KR | 10-2021-0117809 A | 9/2021 |
| KR | 10-2381277 B1 | 3/2022 |
| KR | 10-2437376 B1 | 8/2022 |

\* cited by examiner

ARTIFICIAL INTELLIGENCE-BASED CYBER TRAINING METHOD AND APPARATUS

CROSS REFERENCE TO RELATED APPLICATION

This application claims the benefit of Korean Patent Application No. 10-2022-0152658, filed Nov. 15, 2022, which is hereby incorporated by reference in its entirety into this application.

BACKGROUND OF THE INVENTION

1. Technical Field

The present disclosure relates generally to a cyber training method and apparatus, which simultaneously perform both cyber attack training and cyber defense training.

2. Description of the Related Art

With the advent of the Fourth Industrial Revolution era, there are changes in information security and cybersecurity paradigm driven by the interest and active utilization of Artificial Intelligence (AI), big data, etc. represented by Information and Communication Technology (ICT). Recently, the boundaries between the physical world and the cyber world, represented by the metaverse or the like, have become increasingly blurred, with the result that threats in a cyber environment are evolving to the extent that they influence the real-world physical domain. Response to security threats such as cyber attacks on public, industrial, and civilian facilities due to the extension of the cyber world, is an essential technology element.

As a response to cyber attacks, the development of education programs to enhance security capabilities and the establishment of a cyber range (hereinafter referred to as 'CR') for training experts are regarded as alternatives. However, because such a CR has the fixed (static) properties of attack and defense techniques based on environmental information, there are limitations in that it is difficult to generate cyber attack tools in consideration of the advancements and changes in the physical world and cyber space, complicated security systems, etc., and to apply complex and diverse attacks and fixed attack and defense scenarios to real environments. Conducting various attack tool executions, attack detection, and defense training targeting services in actual environments or cyber environments in operation pose constraints and risks, thus making it difficult to execute the attack tools and training.

Another approach is to develop technology for defining a model of paths used by attackers to intrude a target network using attack graphs and finding all possible paths based on the defined model. The attack graph generated in this way has a wide range of applications, including the establishment of strategies for network security reinforcement and the evaluation of security. However, the attack graph needs to provide information to take security enhancement policies for attack paths from a defensive perspective by identifying all attack paths without considering the attacker's capabilities. Additionally, there is a limitation in that, although it is possible to increase recall in predicting the paths to be used by the actual attacker, accuracy of prediction is inevitably decreased.

Recently, Breach and Attack Simulation (BAS) technology which has emerged to simulate multi-stage cyber attack actions (scenarios) may allow modeling and simulation of attack sequences (e.g., kill chain) likely to be used by real attackers in ICT environments.

However, BAS has limitations in that it has generalized attack sequences and a virtual simulation environment makes it difficult to establish attack attempt and defense/evasion strategies using rapidly changing ICT environments, the latest sophisticated attack tools, and unknown vulnerabilities.

SUMMARY OF THE INVENTION

Accordingly, the present disclosure has been made keeping in mind the above problems occurring in the prior art, and an object of the present disclosure is to provide an AI-based cyber training method and apparatus, which can simultaneously conduct cyber attack training and cyber defense training in a limited ICT infrastructure and a cyber environment, by generating and executing unit attacks (e.g., a set or sequence of techniques) having a high attack success probability through training of an AI-based attack agent to actively respond to cyber attacks in ICT infrastructure or virtual environment and by generating and executing defense/evasion strategies on unit attacks generated by an AI-based defense/evasion agent.

In accordance with an aspect of the present disclosure to accomplish the above object, there is provided an artificial Intelligence (AI)-based cyber training method, including generating a unit attack by training an attack agent based on environment and state information of a cyber range (CR) and a set of attack tools executable on a system, executing the unit attack in the CR, and then determining whether the unit attack has succeeded, and determining whether to perform an attack or a defense based on whether the unit attack has succeeded.

The AI-based cyber training method may further include when the unit attack has failed, generating and executing a next unit attack having a high success probability without changing the state of the CR.

The AI-based cyber training method updates state information of CR when a unit attack succeeds, and requests and executes the next unit attack from the attack agent model.

The AI-based cyber training method may further include when the unit attack has succeeded, executing a defense strategy on a defense agent model, and then updating changed environment and state information of the CR.

The AI-based cyber training method may further include when unit attacks corresponding to thresholds preset by a system have failed, retraining the attack agent based on updated environment and state information of the CR, and then generating and executing unit attacks (e.g., a set or sequence of techniques) based on a retrained learning model.

The environment information of the CR may include at least one of a network topology, a user account, user authority, an operating system (OS) type, a host defensive configuration including a firewall, a domain name or an Internet Protocol (IP) address, or a combination thereof.

A data format of the environment information of the CR may include at least one of a numerical attribute, a symbolic attribute or a string, or a combination thereof.

The symbolic attribute and the string may be converted into the following equation:

$$\frac{0\ 0\ 0\ 0\ \frac{1}{|\sum_{i=1}^{n}|}\ \ldots,0\ 0\ 0}{|\Sigma|}$$

The training of the attack agent may be performed based on a reinforcement learning technique.

The reinforcement learning technique may be configured to perform training such that a set of attack tools capable of maximizing a reward is learned or generated.

In accordance with another aspect of the present disclosure to accomplish the above object, there is provided an Artificial Intelligence (AI)-based cyber training apparatus, including memory configured to store a control program for AI-based cyber training, and a processor configured to execute the control program stored in the memory, wherein the processor is configured to generate a unit attack by training an attack agent based on environment and state information of a CR and a set of attack tools executable on a system, execute the unit attack in the CR, and then determine whether the unit attack has succeeded, and determine whether to perform an attack or a defense based on whether the unit attack has succeeded.

The processor may be configured to, when the unit attack has failed, generate and execute a next unit attack having a high success probability without changing the state of the CR.

The processor may be configured to, when the unit attack has succeeded, update the state information of the CR, and request and execute a next unit attack from an attack agent model.

The processor may be configured to, when the unit attack has succeeded, execute a defense strategy on a defense agent model, and then update changed environment and state information of the cyber range.

The processor may be configured to, when unit attacks corresponding to a threshold value preset by a system have failed, retrain the attack agent based on updated environment aid state information of the CR, and then generate and execute unit attacks (e.g., a set or sequence of techniques) based on a retrained learning model.

The environment information of the CR may include at least one of a network topology, a user account, user authority, an operating system (OS) type, a host defensive configuration including a firewall, a domain name or an Internet Protocol (IP) address, or a combination thereof.

A data format of the environment information of the CR may include at least one of a numerical attribute, a symbolic attribute or a string, or a combination thereof.

The symbolic attribute and the string are converted into the following equation:

$$\frac{0\ 0\ 0\ 0\ \frac{1}{|\sum_{i=1}^{n}|}\ \ldots,0\ 0\ 0}{|\Sigma|}$$

The training of the attack agent is performed based on a reinforcement learning technique.

The reinforcement learning technique may be configured to perform training such that a set of attack tools capable of maximizing a reward is learned or generated.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
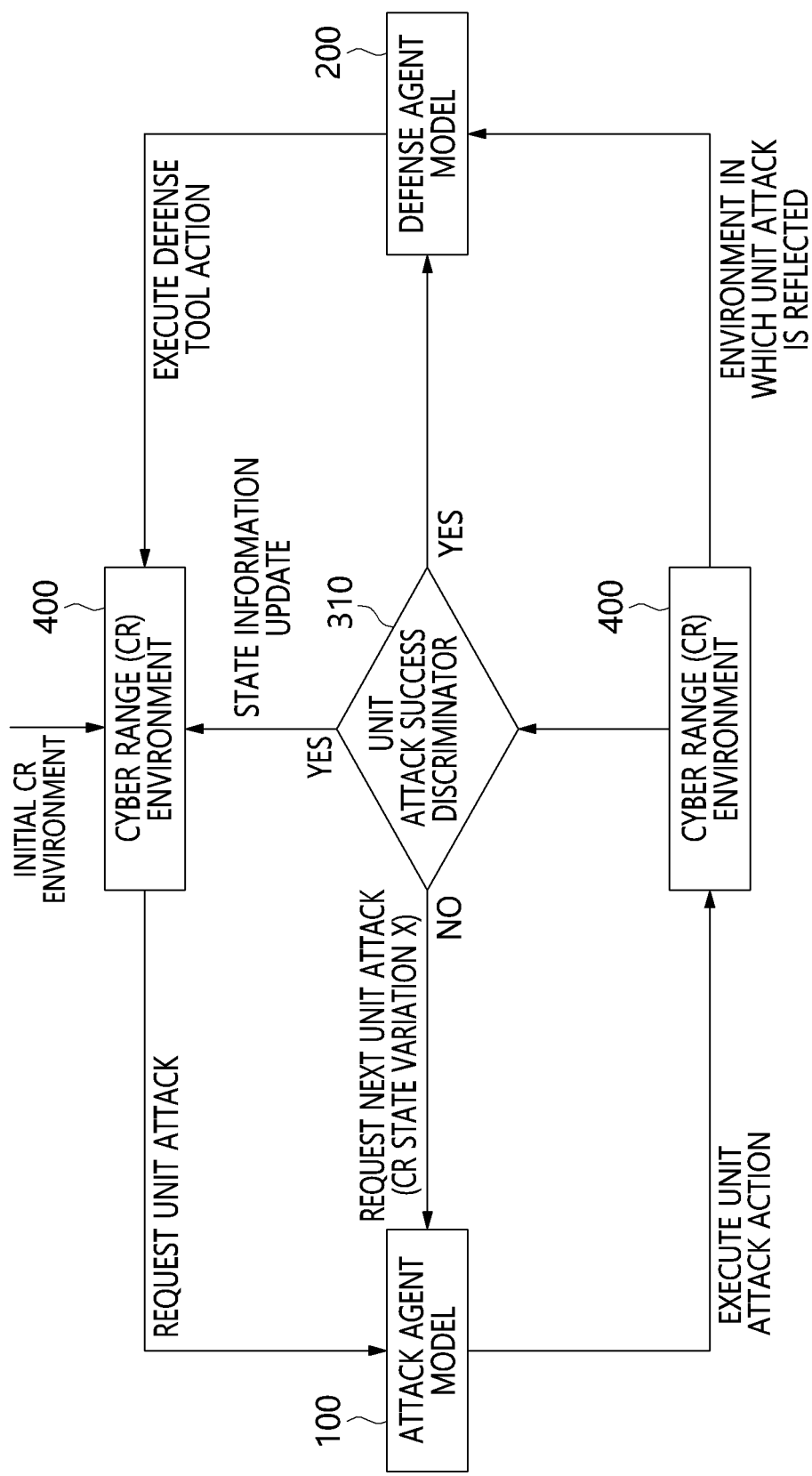
FIG. 1 is a conceptual diagram for explaining an AI-based cyber training apparatus according to an embodiment.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Embodiments of the present disclosure will now be described in detail with reference to the accompanying drawings. Like numerals refer to like elements throughout, and overlapping descriptions will be omitted.

FIG. 1 is a conceptual diagram for explaining an AI-based cyber training apparatus according to an embodiment.

Referring to FIG. 1, the AI-based cyber training apparatus according to an embodiment may include an attack agent model 100, a defense agent model 200, and CR environment 400 to initiate or develop a service, and may simultaneously perform repetitive attack and defense depending on whether each unit attack generated by the attack agent model 100 has succeeded.

The AI based cyber training apparatus according to the embodiment may generate a unit attack by loading a learning model after training an attack agent based on the environment/state information of the initial CR 400 and information in an attack tool database(DB). The AI based cyber training apparatus execute the generated unit attack (or action) in the CR 400, determine, through a unit attack success discriminator 310, whether the unit attack has succeeded, and execute the next unit attack that has a high probability of attack success without changing the state of CR 400 when the unit attack has failed.

When the unit attack succeeds, the AI-based cyber training apparatus according to the embodiment may update the state information of the CR 400, and may request the attack agent model 100 to make a next unit attack and execute the next unit attack.

When the unit attack has succeeded, the AI-based cyber training apparatus according to an embodiment may update the changed environment and state of the CR 400 by executing an optimal defense/evasion strategy on the defense agent model 200.

When all unit attacks corresponding to a threshold value set by the system have failed, the AI-based cyber training apparatus according to the embodiment may load a new learning model by retraining the attack agent with the changed environment/state information of the CR 400, and may newly generate and execute unit attacks (e.g., a set or sequence of techniques) based on the new learning model.

Modules constituting the present disclosure and the initiation of the service according to the present disclosure are not limited to responding apparatuses such as for success in unit attacks and defense against the unit attacks by the CR 400, and may be portions only for description of the embodiments.

Further, environment information collected by the present disclosure does not include a physical configuration device, such as server and network configuration and a topology, and the environment and state information of the CR 400 or the virtual environment, or network connection configuration is merely collectively construed. Consequently, a physical configuration and a processing function such as the configuration of the CR 400 or the unit attack or defense apparatus conform to typical processing and configuration, and thus detailed description thereof will be omitted.

Further, although the number of CR devices is illustrated as two in FIG. 1, the CR devices are separated only for conceptual description, and they represent one CR (environment) device in actual implementation and physical device configuration.

Figure 2:
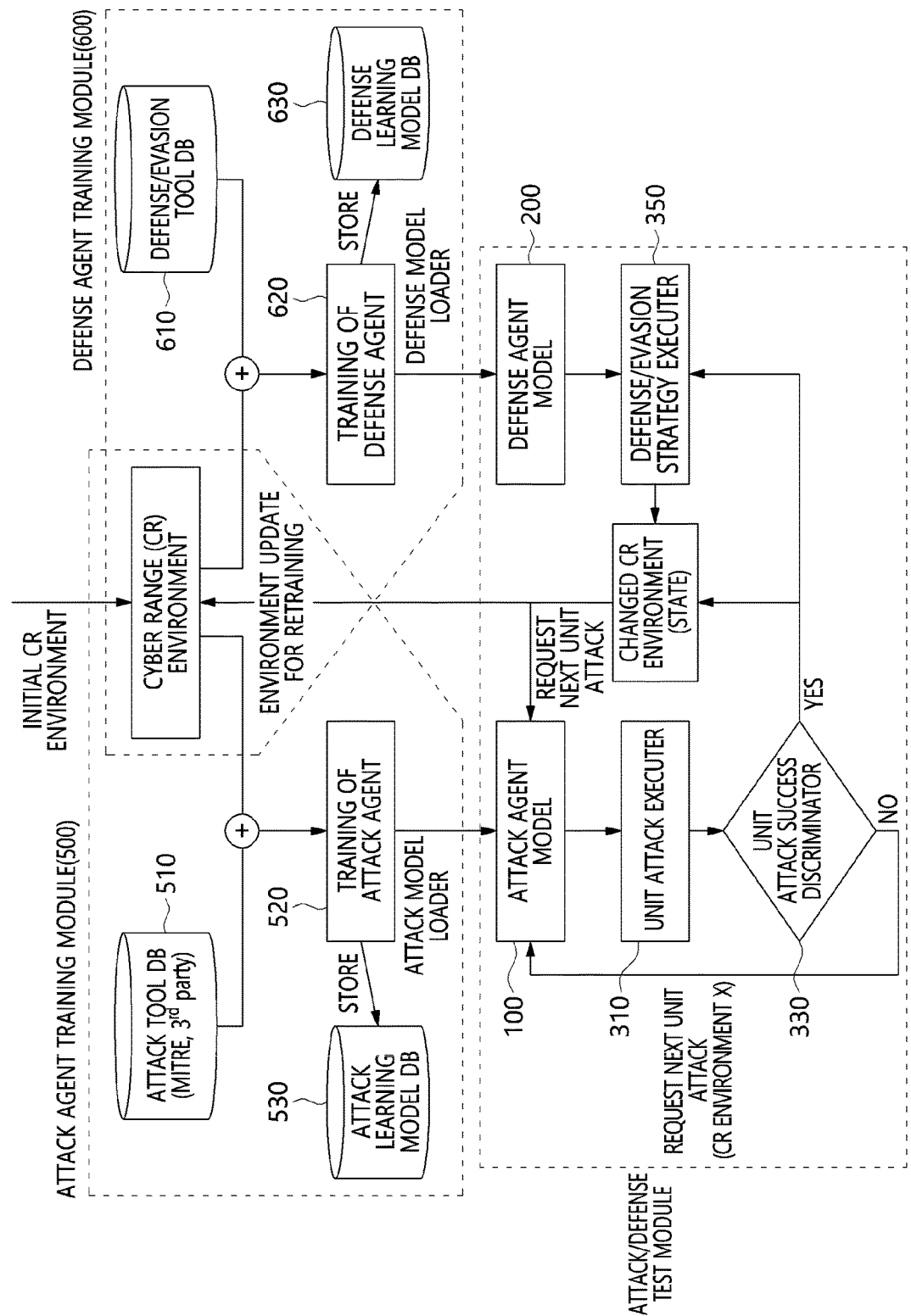
FIG. 2 is a configuration diagram of an AI-based cyber training apparatus according to an embodiment.

FIG. 2 is a configuration diagram of an AI-based cyber training apparatus according to an embodiment.

As illustrated in FIG. 2, the AI-based cyber training apparatus according to the embodiment may include an attack agent training module 500, a defense agent training module 600, and an attack and defense test module 300.

The attack agent training module 500 may collect initial CR environment and state information, and may conduct training of an attack agent 520 by combine the collected information with the unit attack information of an attack tool DB 510. The trained model is stored in the attack learning model DB 530. The optimal model is loaded into the environment of the CR 400 and transferred to the attack agent model 100 of the attack and defense test module 300.

The defense agent training module 600 may conduct training of a defense agent 620 based on the environment and state information of the CR 400 and information in a defense/evasion tool DB 610 previously constructed in the system. The trained model may be stored in a defense learning model DB 630, and an optimal defense model may be loaded therefrom and may be transferred to the defense agent model 200 of the attack/defense test module 300.

The attack/defense test module 300 may execute the unit attack generated by the attack agent model 100 and determine whether the unit attack has succeeded. When it is determined that the unit attack has failed, the attack/defense test module 300 repeatedly perform a process of executing a next unit attack having a high attack success probability through the attack agent model 100, without changing the environment/state information of the CR 400, and of determining whether the next unit attack has succeeded. When it is determined that the corresponding unit attack has succeeded, the attack/defense test module 300 may request the attack agent model 100 to generate a unit attack for a next attack based on the changed state information.

Further, when the unit attack has succeeded, the current environment/state of the CR may be updated with a defense/evasion strategy executer 350. However, for the purpose of retraining, attack agent training and defense agent training may correspond to the case where all of unit attacks set to a threshold value by the system have failed.

Figure 3:
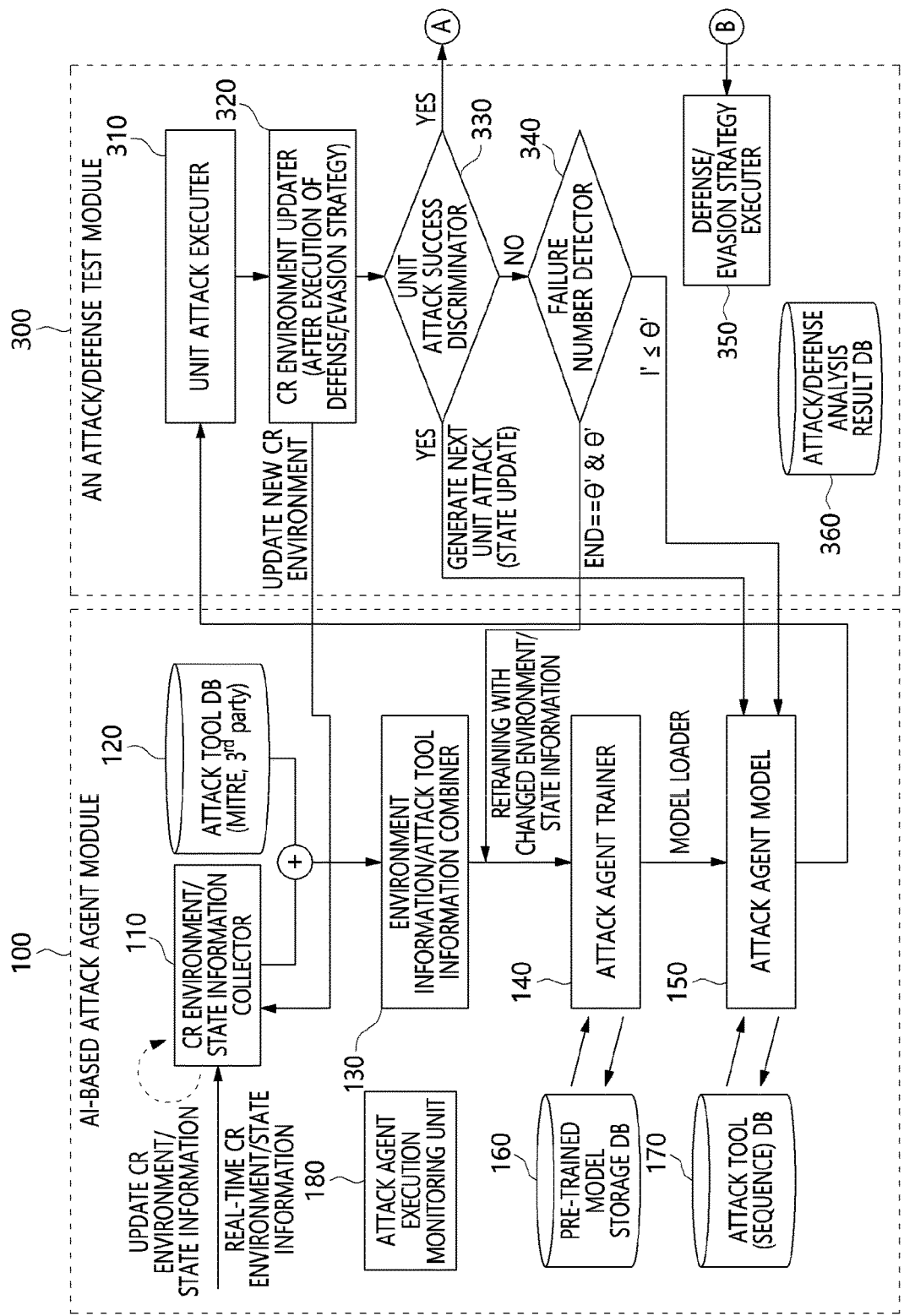
FIGS. 3 and 4 are detailed configuration diagrams of an AI-based cyber training apparatus according to an embodiment.
Figure 4:
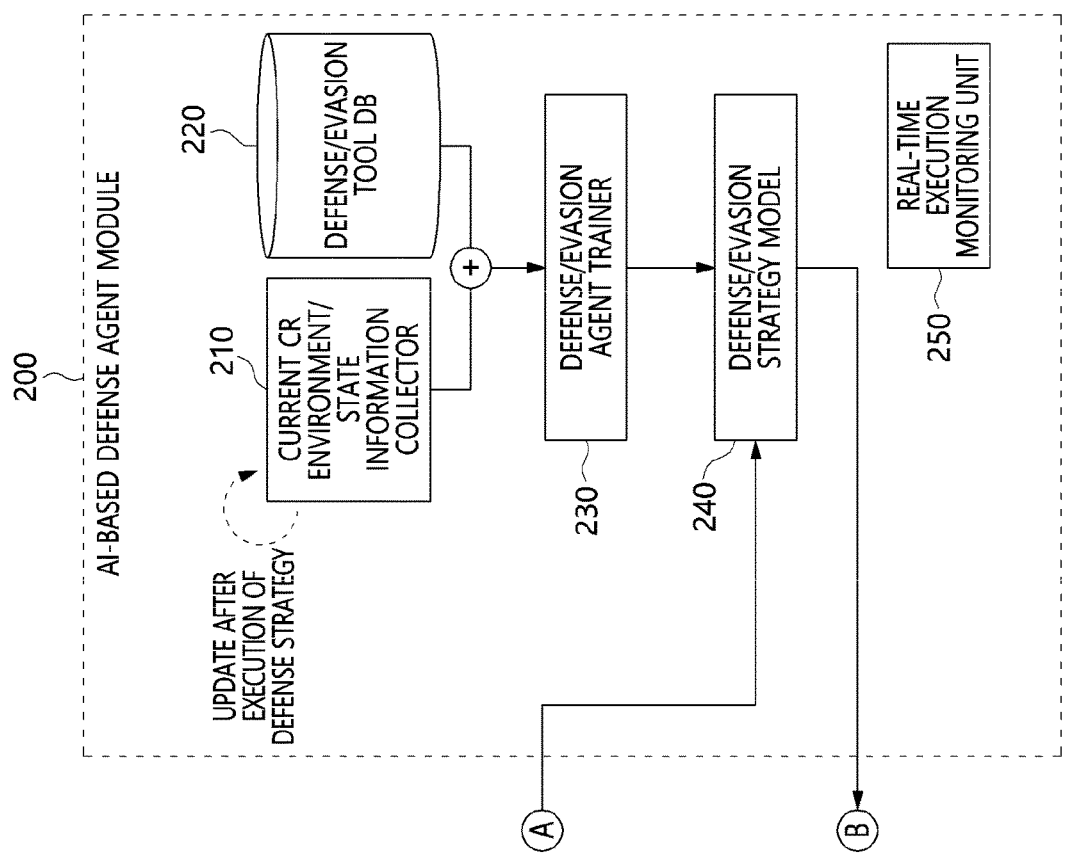

FIGS. 3 and 4 are detailed configuration diagrams of an AI-based cyber training apparatus according to an embodiment.

As illustrated in FIGS. 3 and 4, the AI-based cyber training apparatus according to the embodiment may include an AI-based attack agent module 100, an AI-based defense agent module 200, and an attack/defense test module 300.

The attack agent module 100 may include an information collector 110, an attack tool DB 120, an environment information/attack tool information combiner 130, an attack agent trainer 140, an attack agent model 150, a previously trained model storage DB 160, a previously stored and managed attack tool (sequence) DB 170, and a monitoring unit 180 for monitoring the attack agent in real time.

The information collector 110 may perform a function of collecting configuration information and generated data in a CR or the virtual environment. The collected information may include a network topology, user account and authority, an operating system (OS) type, host defensive configurations such as a firewall, a domain name, and an IP address.

Because a collected data format may be collected in various forms such as a numerical attribute, a symbolic attribute, and a character string (string), a separate conversion task is required so as to utilize the collected data as training data or the like for the generation of attack sequences. Normal numerical data is used without change, and symbolic data and string data desired to be used undergo the following conversion. $\Sigma$ may denote a set of symbolic data values that can be represented in one attribute, and $|\Sigma|$ may denote the number of elements in the set. Assuming that the value of one piece of symbolic or string data is an i-th element, the value of the corresponding symbolic data may be converted and defined by the following Equation (1):

$$\frac{0\ 0\ 0\ 0\ \frac{1}{|\sum_{i=1}^{n}|}\ \ldots,0\ 0\ 0}{|\Sigma|} \tag{1}$$

Components of the attack tool DB 120 can be expressed in numerical values, symbols, or strings. Therefore, a vectorization or a normalization technique can be introduced for attack tools.

In the attack tool DB 120, attacks are arranged and stored in a database (DB) so as to attempt repetitive attacks until the final goal is achieved by applying an appropriate attack technique, among attack techniques possessed by the cyber attackers, according to the unit attack stage. It is built and provided as a database for each type of ATTACK (Adversarial Tactics, Techniques, and Common Knowledge) provided by MITRE. Additionally, the attack tool DB 120 may analyze new attack patterns through the development of ICT technology and cases of damages, and may define the new attack patterns as attack techniques. Examples of such techniques may include Metasploit or the like, and the attack tool DB 120 may perform functions of registering, managing, updating, and deleting the attack techniques. By means of a method of converting symbolic or string data in Equation (1) into numerical attributes, it is possible to convert and represent MITRE ATT&CK attack tools and newly added attack tools into numerical values.

The environment information/attack tool information combiner 130 may combine and use representation methods for respective attack tools or different types of data so as to generate optimal customized attack sequences through organic combinations of environment information and attack tools (techniques). The combined data may undergo deletion or correction of missing values or null values through the environment information/attack tool information combiner 130, and may also undergo Z-score normalization, as shown in the following Equation (2). The reason for this is that the categories and magnitudes of vector values which respective attributes have vary, thus preventing a problem in which the categories and magnitudes of the vector values are dependent on a measurement unit from occurring.

$$\vec{x_i} = \frac{x_i - \mu}{\sigma} \times \alpha \tag{2}$$

The Z-score normalization procedure may perform conversion such that the corresponding data is located within a fixed range such as a range from 0.0 to 1.0, and may apply the same weight to all attribute values. In Equation (2), $\sigma$ and $\mu$ denote the standard deviation and average of the attribute x, and a may be a weight value, which can be set to 1.0 in the present example.

When each normalized column vector is used, the environment information/attack tool information combiner 130 may be intended to reduce a lot of training time and high complexity required for creation of an attack sequence model for high-dimensional classification and prediction. Furthermore, the environment information/attack tool information combiner 130 may generate various combinations of environment information and attack tools, but simple enumeration of attack sequences in one line or random selection of attack sequences is limited in generating attack roots which combine optimal attack tools (techniques) and guarantee variety.

Further, although it is also profitable to generate attack sequences by utilizing all possible information, a search space for finding an optimal solution is complicated, and the analysis of result of executing a unit attack may be difficult.

Therefore, the present embodiment intends to reduce the dimension of data in order to shorten the training time and execution time and improve the generation performance of optimal attack sequences. In order to select a subset having an optimal attribute from among data sets, the present disclosure intends to search for an attribute subset d in which attributes having duplicate properties or unused attributes are previously deleted from a universal attribute set D. In order to find the optimal attribute subset, a conditional probability may be calculated using a best first search method, entropy for an attribute or feature value Y, and a Pearson's correlation coefficient between a set of attack tools of an attack sequence desired to be generated and attributes, and by means of the conditional probability, a minimum number of attributes sets which can mostly similarly represent the probability distribution diagram of all attributes may be searched for. First, in order to acquire respective information gains of respective attributes, the entropy of the arbitrary attribute Y may be calculated using the following Equation (3):

$$H(Y) = -\Sigma_{y \in Y} p(y) \log_2(p(y)) \tag{3}$$

A relationship between attributes X and Y may be a conditional probability of Y occurring when X is given, and may be calculated as represented by the following Equation (4):

$$H(Y|X) = -\Sigma_{x \in X} p(x) \Sigma_{y \in Y} p(y|x) \log_2(p(y|x)) \tag{4}$$

The information gains for respective attributes may be defined by the following Equation (5) using Equations (3) and (4).

$$\text{Gain} = H(Y) + H(X) - H(X, Y) \tag{5}$$

Based on the information gain obtained in Equation (5), the distributions of arbitrary two attributes X and Y and the correlation therebetween may be calculated using symmetrical uncertainty, as shown in Equation (6). Here, when the attribute Y shows a high distribution and correlation with respect to the attribute X, the attribute X may be included, in two attributes capable of efficiently representing all attributes, but the attribute Y is not included. Similarly, subsets may be configured by calculating distributions and correlations between the target class and attributes.

$$\text{Symmetrical uncertainty coefficient} = 2.0 \times \left[\frac{\text{Gain}}{H(Y) + H(X)}\right] \tag{6}$$

In order to evaluate how efficiently each subset $Fs \subset F$ represents all attributes thereof, the following Equation (7), indicating the Merit Function, is used.

$$\text{Merit}(F_S) = \frac{k\overline{r_{cf}}}{\sqrt{k + k(k-1)\overline{r_{ff}}}} \quad (7)$$

A subset for which the value of the Merit Function is the largest is a set that is capable of optimally representing all attributes. Here, k denotes the number of attributes in the subset Fs, $\overline{r_{cf}}$ denotes the average contribution of the attributes included in Fs, and $\overline{r_{ff}}$ denotes the average correlation of the corresponding attributes.

As a result, the embodiment combines environment information with attack tool information, but there is a strong possibility that the amounts of information will be different from each other and high-dimensional sparse data. Therefore, the environment information/attack tool information combiner may perform functions of detecting an optimal attribute set based on a conditional probability-based optimal attribute set using the Pearson's correlation coefficient, and utilizing the data as data of a learning model for generating an attack tool (sequence). The present specification and embodiment show only examples of the use of a restrictive CR environment or resources limited to the system. Also, in the configuration of a system in which large-capacity memory and storage used to process high-dimensional environment information and an attack tool can be installed, the use of the Merit Function, such as that shown in Equation (7), may be omitted.

The attack agent trainer 140 may conduct training of an attack agent based on the environment and state information of the CR collected in real time and a set of attack tools executable on the system. In the present disclosure, a method for configuring and implementing the apparatus will be described by exemplifying a reinforcement learning technique for the training of the attack agent.

Training the attack agent is not limited to a reinforcement learning method. When the purpose of the training of the attack agent in CR is to access a specific host or application, raise authority, leak information, or the like, it is specified that generation of an attack sequence (scenario), which is a set of several attack tools, is also performed through a Hidden Markov model (HMM), a Finite State Machine (FSM), Long Short-Term Memory (LSTM) of deep learning, or the like.

Also, when unit attacks in an attack sequence are defined as independent states having no continuity and are trained using a prediction and classification problem, it is intended to specify that an algorithm such as a Support Vector Machine (SVM) or RandomForest among machine learning techniques may also be utilized.

The reinforcement learning exemplified in the present disclosure is a method of learning which action is to be taken as an optimal action in the state of the current CR, and is configured to perform learning so that a reward is maximized when the corresponding action (in this example, an attack tool such as initial access, authority raising, or information leakage) is taken. That is, the purpose of reinforcement learning is to perform training so that an attack sequence (or set of attack tools) enabling a reward to be maximized is learned or generated.

Depending on the purpose of generating an attack sequence, each unit attack (e.g., technique) in the attack sequence may take an action that locally maximizes a reward, or may select an action (i.e., 'unit attack' in this case) so that the total sum of finally obtained reward values is maximized. Here, the attack sequence may be selected as a set of actions that may maximize a reward in each unit attack. Alternatively, a strategy for selecting an action may be taken such that, even if an immediate reward value (by the current action or unit attack) is slightly small, the sum of reward values including values to be subsequently obtained is maximized, in order to achieve the final goal.

In an embodiment of the present disclosure, the optimal attack sequence is generated by selecting actions such that the reward value that can be finally obtained is maximized. Next, an example in which a reinforcement learning-based environment desired to be disclosed and implemented in the present disclosure is mapped to an attack agent, an action, and a reward value is provided.

In an embodiment, the environment and state set of the CR is S, an action set or a set of unit attacks is A, and a set of rewards is set to r∈R. At time t corresponding to each attack tool in each attack sequence, the agent has its own state $s_t \in S$ and an executable action or unit attack $A(s_t)$. At this time, the agent selects any action $a \in A(s_t)$, and receives a new state $s_{t+1}$ and a reward $r_{t+1}$ from the environment. While this process is repeated, the attack agent may obtain the policy π:S→A for maximizing the accumulated reward value R. Assuming that there is the final state of the attack sequence, the final state is represented by the accumulated reward value $R = r_0 + r_1 + r_2 + \ldots + r_n = \sum_{t=1}^{n} r_t$ in the Markov decision process. The reward value R accumulated in the Markov decision process in which there is no final state may be defined by $\sum_{t=1}^{n} \gamma^t r_t$. Here, γ may be a discount factor representing how valuable a future reward is in the current state, and may be set to a value ranging from 0 to 1.

As described above, the case where the application of the reinforcement learning algorithm to the training of the attack agent according to the present disclosure is described by way of example. The definition and implementation of the problem in the present disclosure is not limited to a single method such as reinforcement learning, and the development of devices is possible by applying a Deep Q-Network (DQN), State-Action-Reward-State-Action (SARSA), a policy gradient, Actor Critic, A2C, or A3C depending on the elements of the CR and the purpose of attack and defense agents.

The attack agent model 150 may load the learning model of the attack agent trainer 140, and may generate a unit attack (or a set of unit attacks or an attack sequence). In this case, the attack agent model 150 generates a number of sequences corresponding to a threshold value (e.g., θ' that is a comparison value of a unit attack failure number detector 340) defined by the system, and stores the unit attacks in descending order of success probability (possibility) in an attack tool storage DB 170, rather than selecting only one unit attack having the highest attack success probability or goal achievement probability. The reason for this is to obtain an advantage in which, when all unit attacks in the corresponding environment (or state) fail, an advantage is to be obtained in which a unit attack sequence having a next-highest success probability may be invoked from the previously generated and stored attack sequences, and unit attacks for goal achievement may be re-executed, prior to retraining the attack agent in consideration of change in the environment/state information of the CR.

Here, for the threshold value θ" for designating the number of attack sequences, the number of attack sequences may be predefined (e.g., attack sequences are designated in descending order of the attack success probability and the number of attack sequences having a higher attack success probability is designated as 3, 5, 10, or the like) in consideration of requirements by the training manager of the CR or an attack agent operator, or may be parameter values that can be changed during the operation of the system.

Figure 5:
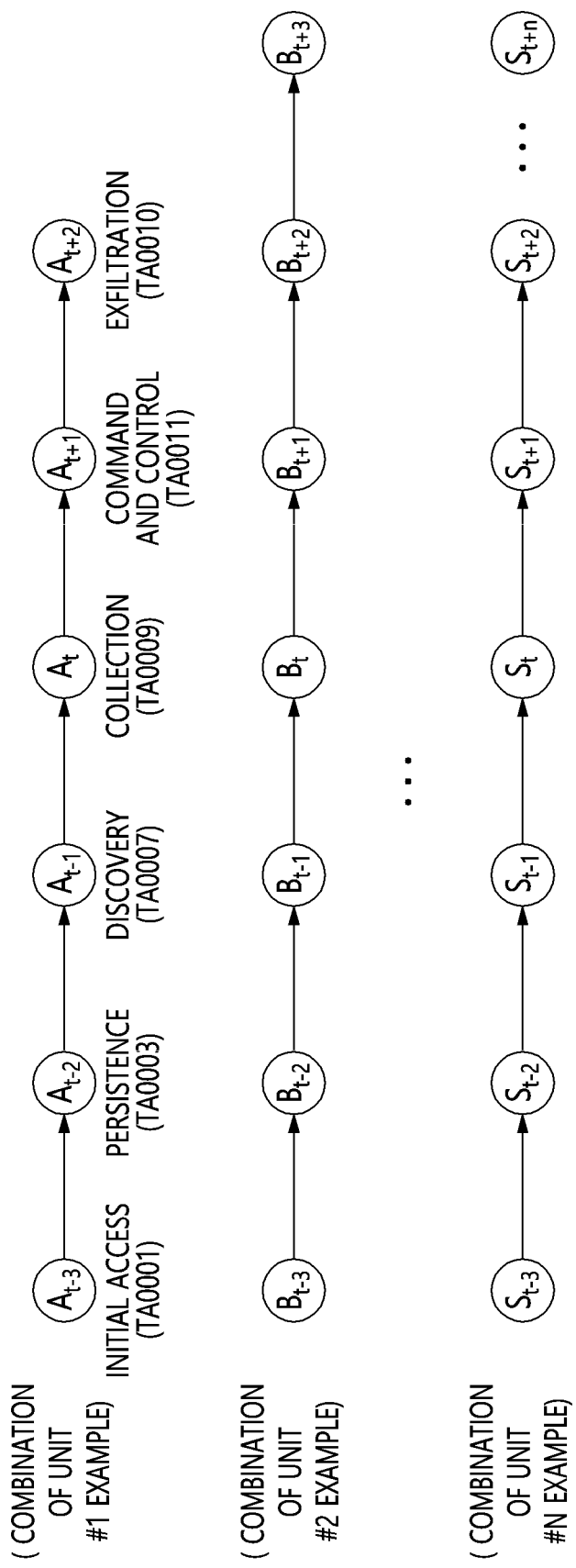
FIG. 5 is a diagram illustrating an example of generation of combinations of AI-based optimal multiple attack tools (sequences) according to an embodiment.

FIG. 5 is a diagram illustrating an example of generation of combinations of AI-based optimal multiple attack tools (sequences) according to an embodiment.

As illustrated in FIG. 5, attack tools (or sequences) that are newly generated by the attack agent model 150 are illustrated. In an embodiment, θ" attack tools or sequences may be generated in descending order of attack success probability or goal achievement probability (e.g., sequence #1>sequence #2> . . . >sequence #N corresponding to the combinations of unit attacks).

Referring back to FIGS. 3 and 4, a previous learning model storage DB 160 may store a model trained by the attack agent trainer 140, may load and use a previous learning model, which is stored in advance depending on the purpose of the system, without randomly selecting initial weights and hyper parameters, and may then be used to create an optimal learning model that is faster and more stable.

The attack tool storage DB 170 may be a DB which stores or backs up unit attacks generated by the system through the attack agent model 150. Alternatively, the attack tool storage DB 170 may be a repository, which stores attack sequences generated by past training of the attack agent during a period (cycle) defined by the system when the environment and state information of the CR are similar, and from which the attack sequences can be invoked and reused.

An attack agent real-time monitoring unit 180 may monitor actions such as the overall state, progress, and exception processing of the AI-based attack agent module 100, and may report monitoring results to a manager or a user in the form of a GUI or text.

The AI-based defense agent module 200 may include a current CR environment and state information collector 210, a defense/evasion tool DB 220, a defense/evasion agent trainer 230 using attack learning model information, a defense/evasion strategy model 240, and the real-time execution monitoring unit 250 of the defense/evasion agent.

The information collector 210 may receive environment information and utilize the environment information for training a defense/evasion agent when the attack agent module generates a unit attack. However, when the unit attack success determiner 330 detects that the corresponding unit attack has succeeded, a defense/evasion strategy, selected by the defense/evasion strategy model 240, is executed in the CR, and the environment and state of the CR in the defense agent are updated.

The defense/evasion tool DB 220 may construct and store existing well-known defense techniques or evasion methods into a database (DB). Further, through a separate external interface, defense techniques to be newly updated or developed may be added. As examples of the defense and evasion method, there are MITRE ATT&CK mitigations or the like. As examples thereof, Account Use Policies corresponding to ID M1036, M1015's Active Directory Configuration, M1049's Antivirus or Antimalware, etc. may be stored in the DB, may be used as feature values in training of the defense agent, and may be utilized for optimal defense agent training in consideration of the environment and state of the CR.

The defense/evasion agent trainer 230 knows the environment and state information of the current CR, invokes an executable defense/evasion strategy list from the DB, and trains the defense agent. In the training of the defense agent, a unit attack $A_t$ at the current time is known with reference to the result of training by the attack agent trainer 140 and the result of the attack agent model 150. Therefore, the unit attack $A_t$ may be utilized for training the defense agent so that a next unit attack $A_{t+1}$ does not succeed.

In the present embodiment, it has been described that the defense/evasion agent trainer 230 may be practiced and implemented to generate a defense strategy for the next unit attack $A_{t+1}$ with reference to the model of the attack agent trainer 140. In another example, there is a method in which, even though the learning model of the attack agent trainer 140 is not known, the defense/evasion agent trainer 230 generates an optimal defense strategy by training the defense/evasion agent based on a reinforcement learning algorithm using only the environment/state information of the current CR and the defense/evasion tool. This is an approach that can be executed and implemented, and may implement a defense agent by independently training the defense agent without being dependent on the learning model of the attack agent trainer 140.

The defense/evasion strategy model 240 lists up or stores a number of strategies or techniques, learned by the defense/evasion prediction model of the defense/evasion agent trainer 230, in memory so that the number of strategies or techniques reaches X designated as the threshold value of the system. When it is determined by the unit attack success determiner 330 that the attack has succeeded, defense techniques ranging from $X_1$ to $X_2, X_3, \ldots, X_n$ are invoked from a defense/evasion strategy list for a next unit action (e.g., the next action is $A_{t+1}$ assuming that the current action or unit attack is $A_t$) and are transmitted to and executed by the defense/evasion strategy executer 240 so that the next unit attack $A_{t+1}$ does not succeed. Thereafter, when the success of the unit attack is detected, the above-described processes may be repeatedly performed in the above sequence such that a next action or unit attack $A_{t+2}$ does not succeed.

The real-time execution monitoring unit 250 of the defense/evasion agent may monitor the results of the entire state, progress, and exception processing of the AI-based defense agent module 200, and may report the results of monitoring to the manager or the user in the form of a GUI or text.

The attack and defense test module 300 may include a unit attack executer 310 for executing a unit attack (scenario), a CR environment updater 320 for updating a cyber environment and state that have changed after the defense/evasion strategy is executed by the defense/evasion strategy executer 350, the unit attack success determiner 330 for measuring whether each unit attack has succeeded, the failure number detector 340 for detecting the number of failures in the unit attack depending on a given threshold value and requesting the attack agent to generate a next unit attack or requesting retraining from the attack agent based on the environment and state information updated by the CR environment updater 320, the defense/evasion strategy executer 350 for, when the unit attack has succeeded, executing the corresponding strategy generated by the defense/evasion strategy model 240, and an attack/defense analysis result database (DB) 360 for analyzing and storing the results of unit attacks and the results of execution of defense strategies.

The devices configured in the attack and defense test module 300 sequentially execute unit attacks (actions), having a highest success probability and generated by the attack agent model 150, and then predict a next unit attack and execute a defense function simultaneously with success in attacks when the unit attacks have succeeded. That is, the attack and defense test module 300 may be a module configured such that attacks and defenses are simultaneously executed in the CR or such that attacks and defenses are bidirectionally or alternately trained or executed. In a detailed example, even though the environment and state information of the CR is changed each time, an optimal unit attack generated by the AI-based attack agent may be executed, and the AI-based defense agent confronting the optimal unit attack may perform the function of simultaneously executing (e.g., cyber attack and defense, or an offensive defensive battle) an optimal defense/evasion strategy so that, even though the current unit attack (action) has succeeded, a next unit attack fails.

The unit attack executer 310 invokes and executes a unit attack, which has the highest attack success probability and is generated by the attack agent model 150. However, depending on whether the unit attack success determiner 330 for measuring whether the unit attack has succeeded determines that the attack has succeeded, a next action (a unit attack or technique having the next-highest attack success probability) generated through training by the attack agent trainer 140 is generated and executed by the attack agent model 150.

When the unit attacks do not succeed even though a number of unit attacks corresponding to a threshold value defined by the system in the current CR environment are executed, unit attacks are sequentially executed as a set of unit attacks having the next-highest attack success probability by the attack failure number detector 340. The execution of a unit attack, the update of the CR environment, detection of success or failure in the unit attack, detection of the number of failures in the unit attack (as will be described later, detection of whether each unit attack has succeeded, and detection of the number of failures in the unit attack set as a threshold value by the system), and CR environment update 320 depending on the execution of the defense/evasion strategy executer 350 may be partially or entirely considered to execute attack or defense. Based on this procedure, when a unit attack fails in the corresponding CR environment, a unit attack having the next-highest attack success probability is executed, or a set of next unit attacks is selected and executed. Finally, the attack agent is retrained based on the CR environment/state information that has changed by the defense/evasion strategy executer 350, and then the above process is repeatedly performed.

Figure 6:
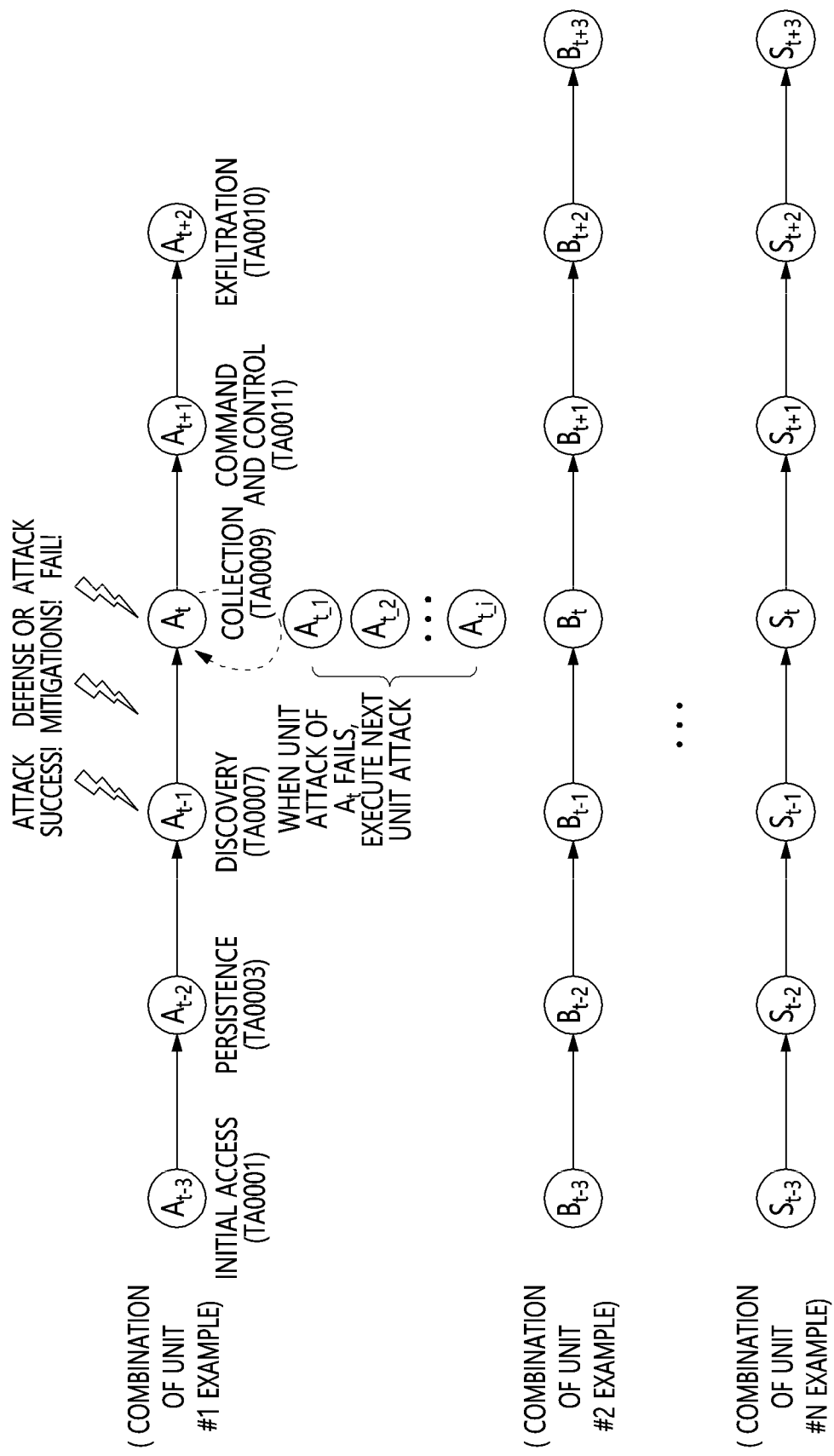
FIG. 6 is a flowchart illustrating the generation and execution of attack agent-based optimal unit attacks according to an embodiment.

FIG. 6 is a flowchart illustrating the generation and execution of an attack agent-based optimal unit attack according to an embodiment.

In detail, FIG. 6 illustrates an example in which a unit attack having a high attack success probability is generated, selected, and executed depending on the result determined by the unit attack success determiner 330.

Referring back to FIGS. 3 and 4, the CR environment updater 320 performs a function of updating the environment or state information of the CR that has changed by the defense/evasion strategy executer 350 when a currently selected unit attack has succeeded. Further, the changed CR environment or state information may be transmitted to the CR environment/state information collector 100 and the current CR environment/state information collector 210 according to the present disclosure, and may then be processed to be utilized as information for retraining of the attack agent and the defense agent.

The unit attack success determiner 330 may be a device for determining whether the attack executed by the unit attack executer 310 has succeeded. When the attack has succeeded in the current CR environment, the unit attack success determiner 330 sends success information to the attack agent trainer 140, and loads a next unit attack that is generated. Simultaneously with this, the unit attack success determiner 330 transmits a result indicating success in the attack to the defense/evasion strategy model 240, thus enabling the defense agent to select and execute an optimal defense/evasion strategy. When the unit attack fails, the unit attack success determiner 330 sends an attack failure message to the attack agent trainer 140, generates a unit attack having the next highest success probability in the current environment tack, and transmits the unit attack to the executer 310, thus enabling the above-described procedures to be repeatedly performed.

The detection of the number of attack failures by the attack failure number detector 340 is performed a number of times identical to the number of repetitive trials (e.g., the unit attack in the currently selected optimal attack sequence is I', and the sequence (set) of the attack tool having the next-highest attack success probability is I") depending on the threshold values (e.g., $\theta'$ and $\theta''$, wherein the number and range of threshold values are not limited thereto) defined by the system of the present disclosure.

According to the implementation and embodiment of the present disclosure, the threshold value $\theta'$ is a parameter for determining the number of unit attacks in descending order of attack success probability for the corresponding attack tool (action) upon generating attack sequences. For example, the threshold value may be set such that, in execution of a unit attack called "initial access" if necessary, $\theta'$ is set to 5, and in execution of an attack tool called "authority-raising", $\theta'$ is set to 10. That is, a maximum of five initial access unit attacks may be present in the current environment and may be executed, all of five the unit attacks may be executed in the initial access, and unit attacks are sequentially re-executed until the variable I' indicating the number of repetitions attributable to failure satisfies the conditional expression I'≤$\theta'$.

In a detailed example, because failure in the selected unit attacks is determined by the unit attack success determiner 330, it is profitable to set the initial value of I' to 1. Here, all unit attacks may be sequentially executed until the variable I' becomes less than or equal to the value of the parameter $\theta'$, which is a threshold value, while increasing the value of I' by +1 when selecting a second unit attack generated by the attack agent model 150. For example, the current state may be $A_{t\_j}$ of combination #1 of unit attacks.

For example, when all unit attacks are attempted until the variable I' satisfies the conditional expression, but has failed in the attacks, a combination of unit attacks having a second-highest (i.e., next-highest) success probability may be invoked and used from the attack agent model 150, or unit attacks in which information of the CR environment updated by the CR environment updater 320 is reflected may be sequentially executed by the unit attack executer 310. That is, when the combination of unit attacks having the next-highest success probability is invoked and executed, a number of unit attacks identical to $\theta''$ defined by the system may be listed up or stored, and may then be used. When all attacks have failed in spite of execution of all unit attacks identical to $\theta'$, and a number of next unit attacks identical to $\theta''$ have also failed (e.g., both $\theta'$ and $\theta''$ are terminated), the attack agent trainer 140 performs retraining based on the environment and state information of the CR updated by the CR environment updater 320, and new unit attacks may be sequentially generated through the attack agent model 150 and may be provided to the unit attack executer 310.

When the unit attack succeeds in the current state (e.g., $A_t$ of FIGS. 5 and 6), a defense strategy (e.g., a change in environment information, a change in port number, re-setting of a firewall, or the like) is executed so that a next unit attack or action (e.g., $A_{t+1}$ of FIG. 5) does not succeed based on the strategy generated by the defense/evasion strategy model of the defense/evasion strategy executer 350. Therefore, the next unit attack or action (e.g., $A_{t+1}$ of FIG. 5) generated through training of the attack agent have a strong possibility of failure depending on the environment/ state change although the unit attack will succeed if the change in the CR environment/state information is less by the defense/evasion strategy model of the defense/evasion strategy executer 350. Even though the unit attack has succeeded, the change in the environment or state will be increased by the defense/evasion strategy model of the defense/evasion strategy executer 350 will be large over time, and thus the possibility of success in a next unit attack or action (e.g., $A_{t+2}$) may be decreased.

The attack/defense analysis result analysis DB 360 stores logs and results related to the success and failure in unit attack tools therein, and transmits the environment and state information of the CR, changed after execution of the defense and evasion strategy generated by the defense agent module 200, to the CR environment updater 320. Depending on whether it is determined by the attack failure number detector 340 that the unit attack has failed or succeeded, the results of the attack and defense (attack/defense) may be stored and analyzed, and may be reported to the manager/ attack trainer/defense trainer or the apparatus user of the present disclosure in the form of a GUI or text.

Figure 7:
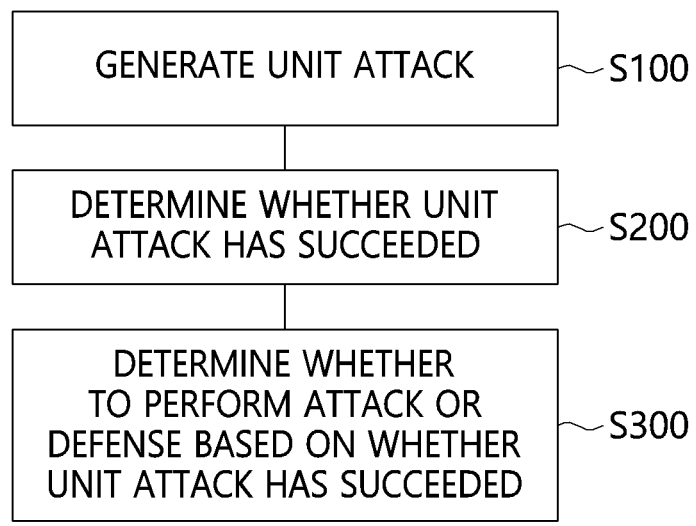
FIG. 7 is a flowchart illustrating an AI-based cyber training method according to an embodiment.

FIG. 7 is a flowchart illustrating an AI-based cyber training method according to an embodiment.

The AI-based cyber training method according to the embodiment may be performed by an AI-based cyber training apparatus according to an embodiment.

As illustrated in FIG. 7, the AI-based cyber training apparatus may generate a unit attack by training an attack agent based on initial environment and state information of a CR, which is collected in real time, and a set of attack tools executable on the system at step S100.

The AI-based cyber training apparatus may determine whether the unit attack is successful by executing the unit attack in the CR at step S200.

The AI-based cyber training apparatus may determine whether to execute an attack or defense based on the result indicating whether the unit attack has succeeded at step S300.

When the unit attack has failed, the AI-based cyber training apparatus may generate and execute a next unit attack having a high success probability without changing the state of the CR.

On the other hand, when the unit attack has succeeded, the AI-based cyber training apparatus may update the state information of the CR, and may request and execute a next unit attack from an attack agent model.

When the unit attack has succeeded, the AI-based cyber training apparatus may execute a defense strategy on a defense agent model, and may then update the changed environment and state information of the CR.

When unit attacks corresponding to a threshold value preset by the system have failed, the AI-based cyber training apparatus may execute retraining of the attack agent based on the newly updated environment and state information of the CR, and may then load a new learning model.

The AI-based cyber training apparatus according to an embodiment may be implemented in a computer system such as a computer-readable storage medium.

Figure 8:
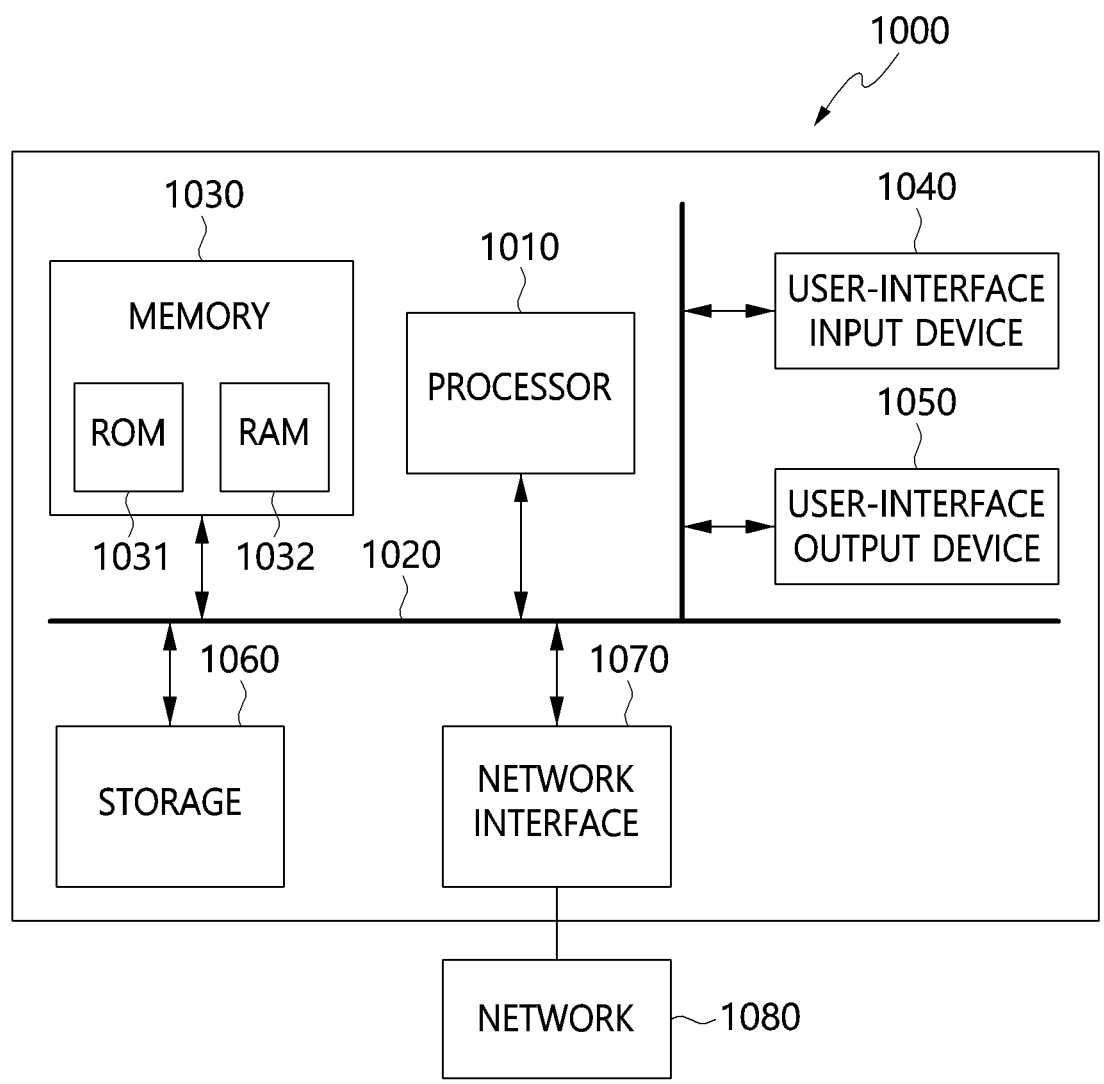
FIG. 8 is a block diagram illustrating the configuration of a computer system according to an embodiment.

FIG. 8 is a block diagram illustrating the configuration of a computer system according to an embodiment.

Referring to FIG. 8, a computer system 1000 according to an embodiment may include one or more processors 1010, memory 1030, a user interface input apparatus 1040, a user interface output apparatus 1050, and storage 1060, which communicate with each other through a bus 1020. The computer system 1000 may further include a network interface 1070 connected to a network 1080.

Each processor 1010 may be a Central Processing Unit (CPU) or a semiconductor apparatus for executing programs or processing instructions stored in the memory 1030 or the storage 1060. The processor 1010 may be a kind of CPU, and may control the overall operation of the AI-based cyber training apparatus.

The processor 1010 may include all types of apparatus capable of processing data. The term processor as herein used may refer to a data-processing apparatus embedded in hardware having circuits physically constructed to perform a function represented in, for example, code or instructions included in the program. The data-processing apparatus embedded in hardware may include, for example, a microprocessor, a CPU, a processor core, a multiprocessor, an application-specific integrated circuit (ASIC), a field-programmable gate array (FPGA), etc., without being limited thereto.

The memory 1030 may store various types of data for the overall operation such as a control program for performing an AI-based cyber training method according to an embodiment. In detail, the memory 1030 may store multiple applications executed by the AI-based cyber training apparatus, and data and instructions for the operation of the AI-based cyber training apparatus.

Each of the memory 1030 and the storage 1060 may be a storage medium including at least one of a volatile medium, a nonvolatile medium, a removable medium, a non-removable medium, a communication medium, an information delivery medium or a combination thereof. For example, the memory 1030 may include Read-Only Memory (ROM) 1031 or Random Access Memory (RAM) 1032.

The particular implementations shown and described herein are illustrative examples of the present disclosure and are not intended to limit the scope of the present disclosure in any way. For the sake of brevity, conventional electronics, control systems, software development, and other functional aspects of the systems may not be described in detail. Furthermore, the connecting lines or connectors shown in the various presented figures are intended to represent exemplary functional relationships and/or physical or logical couplings between the various elements. It should be noted that many alternative or additional functional relationships, physical connections, or logical connections may be present in an actual apparatus. Moreover, no item or component may be essential to the practice of the present disclosure unless the element is specifically described as "essential" or "critical".

The embodiments may generate optimal attack tools (techniques) and defense/evasion strategies, in which the situation of a CR is taken into consideration, may simultaneously or sequentially execute the attack tools and the defense/evasion strategies (e.g., CR and defense, or a cyber offensive defensive battle), and may contribute to simultaneously conducting attack and defense in the CR.

Therefore, the spirit of the present disclosure should not be limitedly defined by the above-described embodiments, and it is appreciated that all ranges of the accompanying claims and equivalents thereof belong to the scope of the spirit of the present disclosure

What is claimed is:

1. An artificial Intelligence (AI)-based cyber training method, comprising:

generating a unit attack by training an attack agent based on environment and state information of a cyber range (CR) and a set of attack tools executable on a system;

executing the unit attack in the CR, and then determining whether the unit attack has succeeded;

in response to determining that the unit attack has not succeeded, generating and executing a next unit attack having a high success probability without changing the state of the CR; and in response to determining that the unit attack has succeeded:

updating the state information of the CR, requesting and executing a next unit attack based on the updated state information from an attack agent model, and executing a defense strategy on a defense agent model, and then updating changed environment and state information of the CR, wherein unit attacks in an attack sequence are defined as independent states and trained to enable a reward to be maximized.

2. The AI-based cyber training method of claim 1, further comprising:

when unit attacks corresponding to a threshold value preset by a system have failed, retraining the attack agent based on updated environment and state information of the CR, and then generating and executing unit attacks based on a retrained learning model.

3. The AI-based cyber training method of claim 1, wherein the environment information of the CR includes at least one of a network topology, a user account, user authority, an operating system (OS) type, a host defensive configuration including a firewall, a domain name or an Internet Protocol (IP) address, or a combination thereof.

4. The AI-based cyber training method of claim 3, wherein a data format of the environment information of the CR includes at least one of a numerical attribute, a symbolic attribute or a string, or a combination thereof.

5. The AI-based cyber training method of claim 4, wherein the symbolic attribute and the string are converted into the numerical form for training.

6. The AI-based cyber training method of claim 1, wherein the training of the attack agent is performed based on a reinforcement learning technique.

7. The AI-based cyber training method of claim 6, wherein the reinforcement learning technique is configured to perform training such that a set of attack tools capable of maximizing a reward is learned or generated.

8. An Artificial Intelligence (AI)-based cyber training apparatus, comprising:

a memory configured to store a control program for AI-based cyber training; and a processor configured to execute the control program stored in the memory, wherein the processor is configured to:

generate a unit attack by training an attack agent based on environment and state information of a cyber range (CR) and a set of attack tools executable on a system, execute the unit attack in the CR, and then determine whether the unit attack has succeeded, in response to determining that the unit attack has not succeeded, generate and execute a next unit attack without changing the state of the CR, the next unit attack having a high success probability; and in response to determining that the unit attack has succeeded:

update the state information of the CR, request and execute a next unit attack based on the updated state information from an attack agent model, and execute a defense strategy on a defense agent model, and then update changed environment and state information of the CR, wherein unit attacks in an attack sequence are defined as independent states and trained to enable a reward to be maximized.

9. The AI-based cyber training apparatus of claim 8, wherein the processor is configured to, when unit attacks corresponding to a threshold value preset by a system have failed, retrain the attack agent based on updated environment and state information of the CR, and then generate and execute unit attacks based on a retrained learning model.

10. The AI-based cyber training apparatus of claim 8, wherein the environment information of the CR includes at least one of a network topology, a user account, user authority, an operating system (OS) type, a host defensive configuration including a firewall, a domain name or an Internet Protocol (IP) address, or a combination thereof.

11. The AI-based cyber training apparatus of claim 10, wherein a data format of the environment information of the CR includes at least one of a numerical attribute, a symbolic attribute or a string, or a combination thereof.

12. The AI-based cyber training apparatus of claim 11, wherein the symbolic attribute and the string are converted into the numerical form for training.

13. The AI-based cyber training apparatus of claim 8, wherein the training of the attack agent is performed based on a reinforcement learning technique.

14. The AI-based cyber training apparatus of claim 13, wherein the reinforcement learning technique is configured to perform training such that a set of attack tools capable of maximizing a reward is learned or generated.

* * * * *